(No Model.)
I. S. HYATT.
FILTERING MATERIAL.
No. 293,741. Patented Feb. 19, 1884.
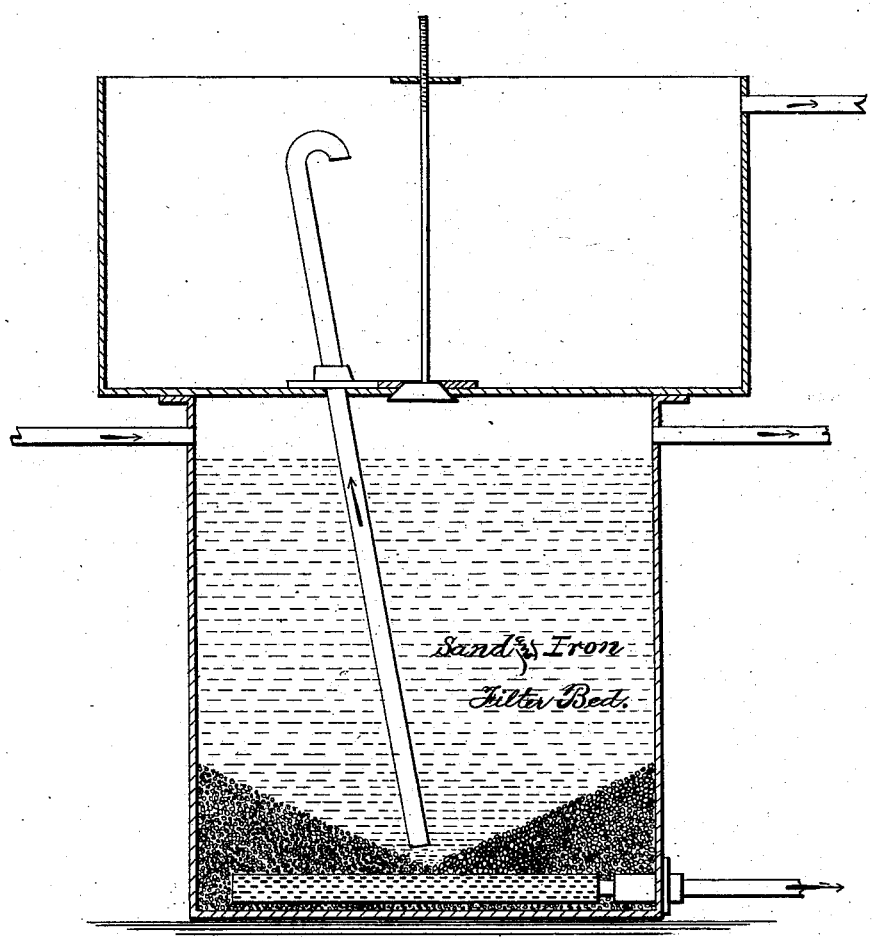
WITNESSES:
Herman Gustow
William B. Ellison
INVENTOR
Isaiah Smith Hyatt,
BY
Chas. B. Gill
ATTORNEY

UNITED STATES PATENT OFFICE.

ISAIAH SMITH HYATT, OF MORRISTOWN, NEW JERSEY.

FILTERING MATERIAL.

SPECIFICATION forming part of Letters Patent No. 293,741, dated February 19, 1884.

Application filed October 6, 1883. (No model.)

*To all whom it may concern:*

Be it known that I, ISAIAH SMITH HYATT, a citizen of the United States, and a resident of Morristown, in the county of Morris and State of New Jersey, have invented certain new and useful Improvements in Filtering Materials, of which the following is a specification.

The invention relates to improvements in filters; and it consists in a new filter-bed, as hereinafter described.

I have discovered that a bed consisting of an inert material and metallic iron in comminuted form may be very successfully employed in effecting the filtration of water. By "inert material" as herein employed I mean a material which will be insoluble in the liquid to be filtered. I have used with good results a bed consisting of from about one (1) part of iron borings or filings to from about fifteen to twenty parts, by weight, of sand or analogous material. This is about the proportion employed for a filter-bed of, say, four or five feet in depth, or more. In shallow filters, or in instances where the liquid contains a large percentage of impurities, I will employ an increased amount of iron. The sand and iron will be thoroughly mixed in any convenient way, and will be employed in the customary manner well understood in the art to which the invention relates. Various materials may be employed in lieu of the sand without departing from the spirit of the invention. For instance, ground quartz or sulphate of baryta may be substituted for the sand with good results.

In the accompanying drawings I have illustrated a sectional view of a filter in connection with which the present invention may be advantageously employed; but I desire it distinctly understood that various other forms of filtering apparatus may be used with entirely satisfactory results. The filter shown is substantially similar to that described in Letters Patent of the United States No. 273,543, and when this is employed the method of filtration and of cleansing the filter-bed described in said patent will be followed.

When the filter illustrated is made use of in connection with the present invention, it will be found that the sand or analogous material combined with the iron facilitates the movement of the filter-bed through the transfer-pipe during the process of purifying the bed of arrested silt and other matter.

I do not limit myself to the use of any particular inert material, nor to the exact proportions specified, nor to a filtering apparatus of any special construction; but

What I claim as new, and desire to secure by Letters Patent, is—

A filter-bed consisting, essentially, of an inert material and metallic iron in comminuted form thoroughly commingled, substantially as set forth.

Signed at New York, in the county of New York and State of New York, this 25th day of September, A. D. 1883.

ISAIAH SMITH HYATT.

Witnesses:
HERMAN GUSTOW,
CHAS. C. GILL.